(12) United States Patent
Craciun et al.

(10) Patent No.: US 11,339,093 B2
(45) Date of Patent: May 24, 2022

(54) GRAPHENE REINFORCED CONCRETE

(71) Applicant: University of Exeter, Exeter (GB)

(72) Inventors: Monica Craciun, Exeter (GB); Dimitar Dimov, Exeter (GB); Saverio Russo, Exeter (GB)

(73) Assignee: UNIVERSITY OF EXETER, Exeter (GB)

( * ) Notice: Subject to any disclaimer, the term of this patent is extended or adjusted under 35 U.S.C. 154(b) by 24 days.

(21) Appl. No.: 16/960,988

(22) PCT Filed: Mar. 12, 2019

(86) PCT No.: PCT/GB2019/050686
§ 371 (c)(1),
(2) Date: Jul. 9, 2020

(87) PCT Pub. No.: WO2019/175564
PCT Pub. Date: Sep. 19, 2019

(65) Prior Publication Data
US 2020/0339473 A1 Oct. 29, 2020

(30) Foreign Application Priority Data
Mar. 16, 2018 (GB) ...................................... 1804261

(51) Int. Cl.
C04B 14/02 (2006.01)
C04B 40/00 (2006.01)

(52) U.S. Cl.
CPC .......... *C04B 14/024* (2013.01); *C04B 14/026* (2013.01); *C04B 40/005* (2013.01); *C04B 40/0042* (2013.01); *C04B 40/0046* (2013.01)

(58) Field of Classification Search
CPC . C04B 14/024; C04B 14/026; C04B 40/0042; C04B 40/0046; C04B 40/005
See application file for complete search history.

(56) References Cited

FOREIGN PATENT DOCUMENTS

| CN | 105801047 A | * | 7/2016 | |
|---|---|---|---|---|
| CN | 106082869 A | * | 11/2016 | |
| CN | 107324737 A | | 11/2017 | |
| CN | 107556035 A | | 1/2018 | |
| EP | 2809714 B1 | | 6/2017 | |
| EP | 3216771 A1 | | 9/2017 | |
| WO | WO-2016028756 A1 | * | 2/2016 | ........... C01B 32/192 |
| WO | 2016154057 A1 | | 9/2016 | |
| WO | 2017092778 A1 | | 6/2017 | |

* cited by examiner

*Primary Examiner* — Anthony J Green
(74) *Attorney, Agent, or Firm* — DeLio Peterson & Curcio LLC; Peter W. Peterson

(57) ABSTRACT

A reinforced concrete material is described comprising a cementitious material (22) in which graphene is substantially uniformly distributed. A method of production of concrete is also described comprising the steps of forming a substantially uniform suspension (20) of graphene with water, and mixing the suspension (20) with a cementitious material (22) to form a concrete material (28).

17 Claims, 2 Drawing Sheets

GRAPHENE REINFORCED CONCRETE

This invention relates to concrete, and in particular to concrete reinforced by the inclusion of a quantity of graphene therein, and to a method of manufacture thereof.

Concrete is used as a building material in a very wide range of applications, including in the construction of buildings, bridges, pipes, paving materials and the like. In a number of applications, its physical properties have traditionally been enhanced by including in the concrete reinforcing members such as steel reinforcing rods. Whilst such macro-scale reinforcements do successfully enhance, for example, the load bearing capacity of the concrete material, it has been found that corrosion of the reinforcing members can result in damage to the structure manufactured using the concrete, limiting the life span of the structure.

Other, nano-scale, reinforcing techniques are known, for example the inclusion of a range of additives to the concrete material can enhance the chemical and/or mechanical bond between component parts of the concrete material, enhancing its strength. During production of concrete, the cement particles thereof undergo a transformation from a powder form to a fibrous crystal form upon reaction with water, and it is the resulting mechanical interlocking of the crystals with one another and other components parts of the concrete that are responsible for giving the concrete a significant part of its strength. The addition of additives such as carbon nanotubes and graphene oxide to the concrete can enhance the structure of the concrete, and so enhance its physical properties.

WO2013/096990 describes the incorporation of graphene oxide within cement and concrete for reinforcement purposes. One problem that is faced in incorporating graphene oxide within cement and concrete is how to go about achieving a substantially uniform dispersion of the graphene oxide within the cement or concrete material. In WO2013/096990, a method is described that involves dispersing the graphene oxide within the liquid component of the cement or concrete before mixing the dispersion with cementitious material to form the cement or concrete. However, graphene oxide is sufficiently hydrophilic that it tends to absorb a significant part of the water contained within the concrete or cement, hampering hydration of the cement. As a consequence, the above described reaction is interfered with, and this can negatively impact upon the formation of the concrete. The incorporation of graphene oxide in this manner to enhance the characteristics of concrete at an industrial scale is thus not thought to be viable.

An object of the invention, therefore, is to provide concrete, and a method of manufacture thereof, in which at least some of the disadvantages associated with previously known materials and the associated methods of manufacture are overcome or are of reduced impact.

According to the present invention there is provided a reinforced concrete material comprising a cementitious material in which graphene is substantially uniformly distributed.

It has been found that the incorporation of graphene within concrete can dramatically enhance certain properties of the concrete, the improvements or enhancements being significantly better than are possible by the incorporation of graphene oxide therein.

The graphene is preferably in the form of flakes. The flakes are preferably of lateral dimensions of less than 5 µm, and more preferably have lateral dimensions in the range of 1-3 µm. More preferably, the flakes have a lateral dimension in the range of 1.5-2.5 µm, the flakes preferably having a lateral dimension in the region of 2 µm. The use of flakes of this size has been found to be advantageous in that the compressive strength of concrete formed using flakes of this size is significantly enhanced.

The graphene is preferably dispersed or suspended within water prior to the formation of the concrete material. Preferably, the concentration of graphene within the water is in the range of 0.2-2.5 g/L, and more preferably is in the range of 0.3-1.5 g/L. Preferably, the concentration is in the range of 0.6-0.8 g/L, and is preferably in the region of 0.7 g/L. It has been found that the use of a graphene suspension containing graphene in these concentrations is advantageous in that the compressive strength of the concrete formed is significantly enhanced.

The invention further relates to a method of production of concrete comprising the steps of forming a substantially uniform suspension of graphene with water, and mixing the suspension with a cementitious material to form a concrete material.

As set out hereinbefore, the graphene is preferably in the form of flakes. The flakes are preferably of lateral dimensions of less than 5 µm, and more preferably have lateral dimensions in the range of 1-3 µm. More preferably, the flakes have a lateral dimension in the range of 1.5-2.5 µm, the flakes preferably having a lateral dimension in the region of 2 µm.

Preferably, the concentration of graphene within the water is in the range of 0.2-2.5 g/L, and more preferably is in the range of 0.3-1.5 g/L. Preferably, the concentration is in the range of 0.6-0.8 g/L, and is preferably in the region of 0.7 g/L.

Not only is concrete formed in this manner of enhanced compressive strength but it also has other enhanced properties. By way of example, its flexural strength is enhanced, and displacement under compressive loadings is reduced. Its heat capacity is increased, and its water permeability is reduced. Additionally, its bond strength to steel may also be increased. The material has been found to be suitable for use in the manufacture of precast concrete products.

As the structural characteristics of the concrete are enhanced, structures manufactured using concrete may require less concrete in order to be of the required strength. As concrete is not an environmentally friendly material, the invention has environmental advantages.

The reduced water permeability may increase the range of applications in which concrete may be used, for example rendering the material better suited to use in applications in areas subjected to flooding.

The suspension of graphene with water may be formed by mixing preformed graphene flakes with water to form a uniform suspension. Alternatively, graphite powder or graphene powder may be mixed with water and a high shear mixer used to exfoliate the graphite or graphene powder to result in the formation of graphene suspended within the water. A surfactant such as sodium cholate may also be used. The surfactant may serve several purposes. Firstly, it reduces the surface tension of the water to substantially match that of the graphene, making shear exfoliation feasible. It also aids in the formation of a substantially uniform suspension of the graphite or graphene powder with the water. Importantly, it also stabilises the graphene water suspension, reducing aggregation of the graphene.

BRIEF DESCRIPTION OF THE DRAWINGS

The invention will further be described, by way of example, with reference to the accompanying drawings, in which:

Referring to FIG. 1, steps in a method for use in the manufacture of graphene reinforced concrete are illustrated. The method comprises the steps of adding graphite powder or graphene powder 10, water 12 and a surfactant in the form of sodium cholate 14 to a vessel 16, and using a high shear mixing device 18 to mix the graphite or graphene powder 10, water 12 and sodium cholate 14. The presence of the surfactant results in the formation of a substantially uniform suspension of the graphite or graphene powder 10 within the water. The high shear mixing device 18 rotates at high speed, for example at a speed in the region of 5000-8000 rpm, the mixing device 18 generating sufficiently high shear forces within the water 12 that the movement of the water 12 is able to cause exfoliation of the powder 10 to form graphene flakes. By way of example, the graphene flakes may be of few layer form, having ten or fewer layers. The mixing device 18 is operated for a period of time in the region of 2 hours to achieve exfoliation of substantially all of the powder 10. Any relatively heavy remaining powder material 10 may be removed by decanting the graphene/water suspension. The presence of the surfactant further serves to result in the graphene forming a substantially uniform suspension 20 with the water, avoiding significant aggregation of the graphene flakes formed in this manner.

Figure 1:
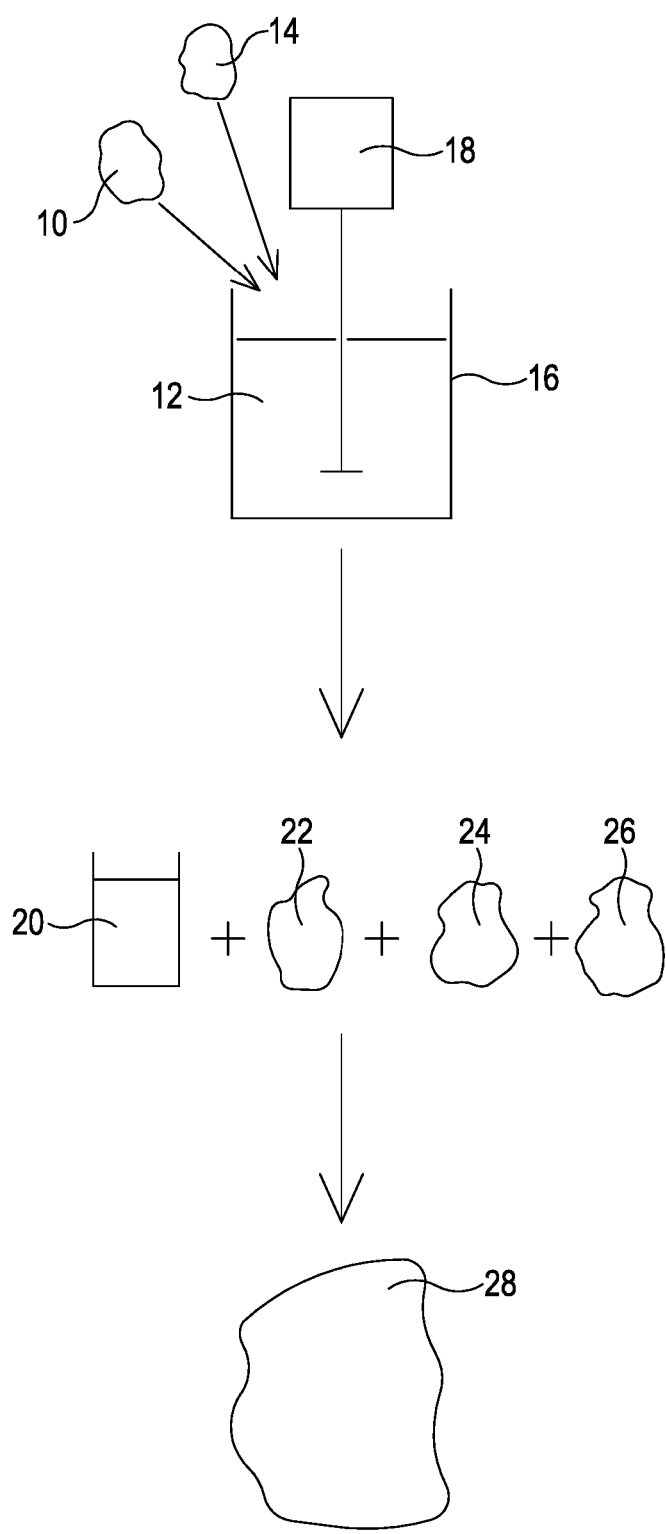
FIG. 1 is a diagrammatic representation of steps in a method of manufacture of concrete in accordance with an embodiment of the invention.

After formation of the graphene/water suspension 20, the suspension 20 is mixed with a cementitious material 22 such as Portland cement, sand 24 and aggregate or gravel 26 to form concrete 28. The mixing of the suspension 20 with the cementitious material 22, sand 24 and gravel 26 is similar to the usual concrete manufacturing process with the exception that the suspension 20 is used in substitution for the water that is usually added to the cementitious material, sand and gravel, and the relative proportions of the materials used in the formation of the concrete is substantially the same as is conventional.

The concrete 28 manufactured in this manner is advantageous compared to concrete manufactured in the conventional manner in that the compressive strength and other characteristics thereof are significantly enhanced. By way of example, tests have shown that the compressive strength may be increased significantly compared to conventional concrete. Furthermore, the flexural strength may be increased significantly, and displacement upon the application of a compressive load may be significantly reduced. The graphene reinforced concrete may have an enhanced heat capacity, and its water permeability may be reduced compared to conventional concrete. The material may have an increased bond strength to steel, and is thought to be suitable for use in the manufacture of precast concrete products.

It has been found that the high surface energy of the graphene material encourages calcium silicate hydrate (C—S—H) particles to bond thereto, forming nucleation sites which promote the growth of the C—S—H gels along the graphene flakes. It is the presence of these gels that gives rise to many of the physical characteristics of concrete, and so by providing the graphene flakes which serve to promote the formation of the C—S—H gels, the bond strength of the cement in the concrete is enhanced. Furthermore, the enhanced formation of C—S—H nucleation sites results in the formation of a denser network of interlocked cement crystals which not only gives rise to enhanced physical properties but also act as a barrier to the ingress of water leading to reduced water permeability.

The enhanced physical characteristics have been found to be stable over time.

The enhanced properties of the graphene reinforced concrete may allow the quantity of concrete required in certain applications to be reduced, leading to savings and increased efficiencies in those applications. The reduced amount of concrete, and hence cement, used in such applications may have significant environmental benefits. The reduced water permeability may allow the use of concrete in certain applications in which, conventionally, concrete would not be suitable for use, for example in some applications in flood prone areas. Also, the reduced water permeability may extend the life span of structures exposed to water, in use, without requiring the application of water resistant additives or coatings or the like to the structures.

The graphene/water suspension 20 may be manufactured at a high rate, for example at a rate of 100 L/h or more, and so industrial scale production of graphene reinforced concrete is possible using the method of this embodiment of the invention.

Figure 2:
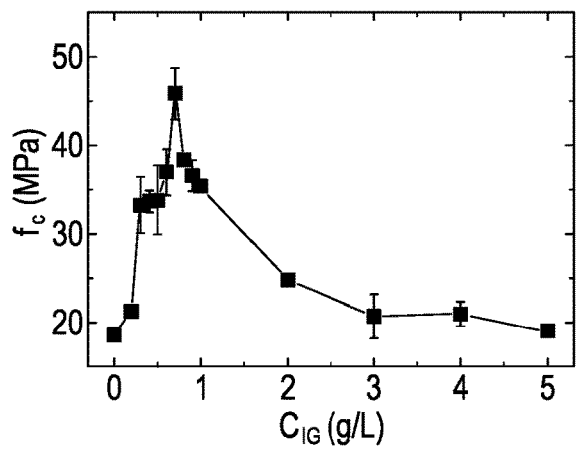
FIGS. 2 to 4 are graphs illustrating the impact upon compressive strength of concrete formed with graphene flakes of a range of sizes and in a range of suspension concentrations.
Figure 3:
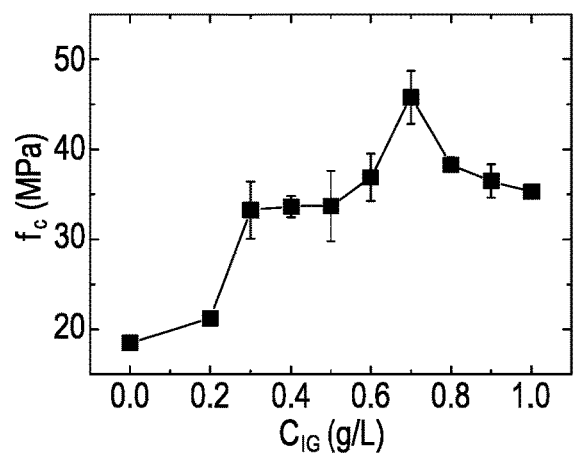

As shown in FIGS. 2 and 3, the concentration of graphene within the suspension is preferably relatively low, for example in the range of 0.2 to 2.5 g/L. More preferably, it is in the range of 0.3-1.5 g/L, and it is conveniently in the range of 0.6-0.8 g/L, for example in the region of 0.7 g/L. The use of a suspension 20 containing this level of graphene has found to be especially advantageous in that the compressive strength of concrete manufactured therewith is particularly enhanced.

Figure 4:
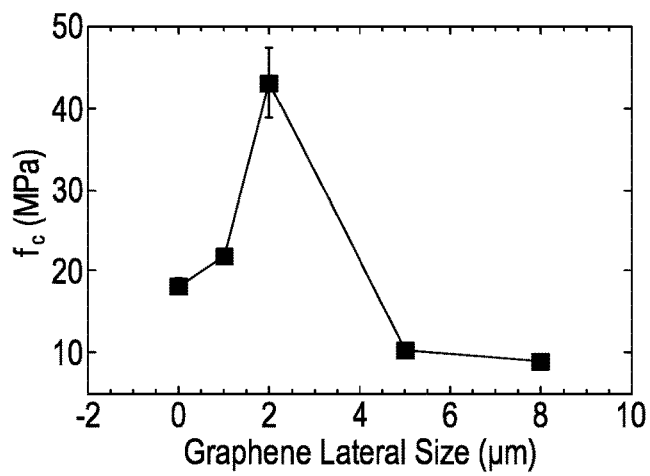

As shown in FIG. 4, the graphene flakes within the suspension 20 are conveniently of lateral dimensions of less than 5 μm, and more preferably have lateral dimensions in the range of 1-3 μm. More preferably still, the flakes have a lateral dimension in the range of 1.5-2.5 μm, the flakes preferably having a lateral dimension in the region of 2 μm. The use of a suspension 20 including graphene flakes of this size is beneficial in that the compressive strength is, again, particularly enhanced.

Although the description hereinbefore is of the use of a surfactant functionalised graphene/water suspension in the manufacture of concrete, the invention may alternatively employ graphene produced using other techniques, and is not restricted to the use of shear exfoliated graphene. By way of example, a suspension may be formed by mixing industrial grade graphene flakes produced using other techniques with water. Such graphene flakes typically have a slightly greater number of layers, for example in the region of 10 to 14 layers. Again, a surfactant may be used to avoid aggregation of the graphene flakes, and so assist in the production of a substantially uniform suspension. The suspension produced in this manner may then be used in the manufacture of concrete using the techniques outlined hereinbefore.

If desired, the concrete material may further include one or more of a range of additives that are commonly used in the manufacture of concrete to enhance the workability and/or other properties thereof. The additives may include, for example, plasticisers or superplasticisers to enhance fluidity and workability, water reducing agents to allow a reduced proportion of water to be used in the material, early age strength improvement agents, retarding admixtures and corrosion inhibiting materials. It will be appreciated that this list is not exhaustive and that other additives may be used, if desired.

The cementitious material 22 may, as mentioned hereinbefore, comprise Portland cement. However, if desired, it may comprise, alternatively or additionally, a cement replacing material such as ground granulated blast furnace slag, fly ash, silica fume or limestone fines.

It will be appreciated that the references herein to graphene are not restricted to monolayer graphene materials but also include other forms of material commonly referred to as graphene, such a bi-layer, tri-layer and few layer graphene, and graphene nano platelets and the like, for example as defined in ISO/TS 80004-13.

Whilst specific embodiments of the invention have been described hereinbefore, a number of modifications and alterations may be made to the concrete and method of manufacture thereof as described hereinbefore without departing from the scope of the invention as defined by the appended claims.

The invention claimed is:

1. A reinforced concrete material comprising a cementitious material in which graphene is substantially uniformly distributed wherein the graphene is dispersed or suspended within water prior to the formation of the concrete material and wherein the concentration of graphene within the water is in the range of 0.2-2.5 g/L.

2. A material according to claim 1, wherein the graphene is in the form of flakes.

3. A material according to claim 2, wherein the flakes are of lateral dimensions of less than 5 μm.

4. A material according to claim 3, wherein the flakes are of lateral dimensions in the range of 1-3 μm.

5. A material according to claim 4, wherein the flakes are of lateral dimensions in the range of 1.5-2.5 μm.

6. A material according to claim 5, wherein the flakes have a lateral dimension in the region of 2 μm.

7. A material according to claim 1, wherein the concentration of graphene within the water is in the range of 0.3-1.5 g/L.

8. A material according to claim 7, wherein the concentration of graphene within the water is in the range of 0.6-0.8 g/L.

9. A material according to claim 8, wherein the concentration of graphene within the water is in the region of 0.7 g/L.

10. A material according to claim 1, further comprising at least one of a plasticiser or superplasticiser, a water reducing agent, an early age strength improvement agent, a retarding admixture and a corrosion inhibiting material.

11. A material according to claim 1, wherein the cementitious material comprises at least one of Portland cement, ground granulated blast furnace slag, fly ash, silica fume and limestone fines.

12. A method of production of concrete comprising the steps of forming a substantially uniform suspension of graphene with water, and mixing the suspension with a cementitious material to form a concrete material wherein the concentration of graphene within the water is in the range of 0.2-2.5 g/L.

13. A method according to claim 12, wherein the graphene is in the form of flakes.

14. A method according to claim 13, wherein the flakes are of lateral dimensions of less than 5 μm.

15. A method according to claim 12, wherein the suspension of graphene with water is formed by mixing preformed graphene flakes with water to form a uniform suspension.

16. A method according to claim 12, wherein the suspension is formed by mixing graphite powder or graphene powder with water and using a high shear mixer to exfoliate the graphite or graphene powder.

17. A method according to claim 15, wherein a surfactant present within the suspension.

* * * * *